United States Patent
Yasuda et al.

(10) Patent No.: US 6,310,116 B1
(45) Date of Patent: Oct. 30, 2001

(54) MOLDED POLYMER ARTICLE HAVING A HYDROPHILIC SURFACE AND PROCESS FOR PRODUCING THE SAME

(75) Inventors: Tokugen Yasuda; Hitoshi Inoue; Satsuki Kitajima; Masahiro Sato; Wu Yang, all of Kyoto; Ikuo Omura, Kurashiki, all of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/157,100

(22) Filed: Sep. 18, 1998

(30) Foreign Application Priority Data

Oct. 9, 1997 (JP) .................................................. 9-293299

(51) Int. Cl.[7] ............................. G02C 7/04; B29D 11/00; C08J 7/16
(52) U.S. Cl. ......................... 523/106; 523/105; 523/107; 264/1.7; 427/2.24; 427/133
(58) Field of Search .................................... 523/105, 106, 523/107; 264/1.7; 427/2.24, 133

(56) References Cited

U.S. PATENT DOCUMENTS

| | | | |
|---|---|---|---|
| 4,800,123 | | 1/1989 | Boeckeler . |
| 5,010,155 | * | 4/1991 | Mueller ................................ 527/301 |
| 5,049,321 | | 9/1991 | Galic . |
| 5,160,463 | * | 11/1992 | Evans et al. . |
| 5,391,589 | * | 2/1995 | Kiguchi et al. . |
| 5,637,265 | * | 6/1997 | Misciagno et al. . |
| 5,779,943 | * | 7/1998 | Enns et al. ............................ 264/1.7 |
| 5,789,461 | * | 8/1998 | Nicolson . |

FOREIGN PATENT DOCUMENTS

| | | | |
|---|---|---|---|
| 362137 | * | 4/1990 | (EP) . |
| 0 362 137 | | 4/1990 | (EP) . |
| 0 472 303 | | 2/1992 | (EP) . |
| 0 797 110 | | 9/1997 | (EP) . |
| 64-84219 | | 3/1989 | (JP) . |
| 7-266443 | | 10/1995 | (JP) . |

* cited by examiner

Primary Examiner—Peter Szekely

(57) ABSTRACT

A molded polymer article comprises a main molded body having on the surface thereof a hydrophilic polymer layer, the article being obtained by polymerizing both a monomer having a hydrophilic group and coated on the surface of a hydrophilic mold, and a polymerizable composition consisting essentially of a monomer and/or oligomer and placed in the mold. The hydrophilic polymer layer has excellent adhesiveness to the main body of the molded polymer article and excellent durability, so that the high hydrophilic property can be maintained, even when the article is exposed to external forces such as friction, over a long period of time. The molded articles are therefore useful as, in particular, contact lenses.

18 Claims, No Drawings

MOLDED POLYMER ARTICLE HAVING A HYDROPHILIC SURFACE AND PROCESS FOR PRODUCING THE SAME

BACKGROUND OF THE INVENTION

1. Field of the Invention

The present invention relates to molded polymer articles having a hydrophilic surface, a process for producing the same and a mold used therefor. More specifically, the present invention relates to molded polymer articles having on the surface thereof a hydrophilic polymer layer which is excellent in the adhesiveness to the main molded body and in durability, a process for producing the same and a mold used therefor.

The molded polymer articles of the present invention can be effectively used, utilizing the above characteristics, for a wide variety of end-uses including medical products such as contact lens, which should be or are desired to be excellent in hydrophilic property and biocompatibility.

The process according to the present invention can produce very smoothly the above molded polymer articles having a hydrophilic surface, provided with the excellent properties.

2. Description of the Prior Art

Modification of the surface of a molded polymer article is widely practiced, to provide the article with a new function which the polymer constituting the main body of the article does not originally possess. In particular, in the field of medical products, various surface modification techniques have been attempted to improve the biocompatibility of the polymer used to human body. Among such medical products, lenses for human eyes, such as contact lenses and intraocular lenses, are made principally of silicone resin and acrylic resins containing silicon and/or fluorine atom. These materials are highly hydrophobic and tend to cause troubles such as lens sticking to cornea, clouding of lens and poor comfort during wear. For contact lenses and similar items obtained from these materials, various attempts have therefore been made to treat the surface to provide it with hydrophilic property, thereby eliminating the disadvantages of lens sticking to cornea and clouding of lens, and improving the comfort during wear.

The processes for rendering hydrophilic the surface of contact lenses or intraocular lenses are roughly classified into: (A) one which comprises at first preparing a lens and then treating its surface to provide hydrophilic property; (B) one which comprises curing and shaping a previously produced polymer into a lens and, at the same time, rendering the surface hydrophilic; and (C) one which comprises molding a polymerizable monomer into a lens and, at the same time, rendering hydrophilic the surface of the resulting article.

The above process (A), producing a lens and then rendering its surface hydrophilic includes: (1) a process which comprises treating a lens with an aqueous alkali solution or hot salt water; (2) one which comprises subjecting a contact lens to discharge treatment in a rarefied gas (see Japanese Patent Publication No. 49288/1980); (3) one which comprises graft polymerizing onto the surface of a contact lens a specific hydrophilic monomer having a phosphate group or a vinyl monomer having a specific phosphatide-like structure (see Japanese Patent Application Laid-open Nos. 122779/1994 and 72430/1995); and (4) one which comprises placing a contact lens under an atmosphere containing a monomer having hydrophilic group and polymerizing the monomer by electrodeless glow discharge to form and bond a film of the resulting hydrophilic polymer onto the surface of the contact lens (see Japanese Patent Application Laid-open No. 83642/1978).

However, the above processes (1) and (2) have the disadvantages that the hydrophilic property of the hydrophilic surface formed on the surface of the lens does not last for a long period of time and is lost in a short period. With the above process (3), insufficient bonding force between the polymer constituting the contact lens main body and the hydrophilic polymer formed by graft polymerization weakens the durability of the latter, so that, in this case also, the hydrophilic property is lost in a short period of time. Likewise, with the above process (4), the hydrophilic polymer film formed on the surface of the contact lens adheres to the lens main body insufficiently and tends to be separated therefrom, so that the hydrophilic property of the surface does not last for a long period of time and tends to be lost when external forces such as friction are applied to the surface.

The above known process (B), which comprises curing and shaping into a lens a previously produced polymer and, simultaneously therewith rendering the surface hydrophilic includes: (5) a process which comprises covering the surface of a previously produced polysiloxane with a radical polymerizable monomer capable of giving a hydrophilic polymer and then irradiating the monomer and polysiloxane with ionizing radiation, to crosslink and shape into a lens the polysiloxane and, at the same time, graft-polymerize the monomer on the surface of the polysiloxane, thereby producing a contact lens covered with the hydrophilic polymer (see Japanese Patent Application Laid-open No. 775/1973, U.S. Pat. No. 4,099,859).

However, this process (5) yields insufficient adhesion on graft polymerization of the radical polymerizable monomer to the polysiloxane, whereby the hydrophilic polymer formed from the monomer becomes not durable and tends to be separated from the polysiloxane. This process is thus not usable for practical purposes.

The above known process (C), which comprises molding a polymerizable monomer into a lens and, simultaneously therewith, rendering the surface hydrophilic includes: (6) one which comprises covering the surface of a mold with a film of a hydrophilic polymer having copolymerizable functional groups, injecting into the mold a monomer or mixtures thereof required for forming a hydrophobic polymer and copolymerizing the monomer or mixtures thereof with the functional groups present in the film, thereby chemically bonding the film of the hydrophilic polymer to the hydrophobic polymer to obtain a contact lens having on the surface thereof a hydrophilic polymer film (see Japanese Patent Application Laid-open No. 124523/1990) and (7) one which comprises copolymerizing a monomer mixture principally comprising a (meth)acrylic acid ester and a crosslinkable monomer in a lens mold the molding surface of which has been covered with a polymer having a release property and hydrophilic property, to produce a copolymer having a contact lens shape and then plasma-treating the surface of the lens (see Japanese Patent Application Laid-open No. 266443/1995).

However, with the above process (6), it is difficult to form a uniform layer of the hydrophilic polymer on the surface of the molded hydrophobic polymer. Furthermore, the formed hydrophilic polymer bonds only insufficiently to the molded hydrophobic polymer. As a result, the product has poor durability and permits its wettability (hydrophilic property) to decrease by such a slight friction as by hand.

With the above process (7), which comprises covering the molding surface of a mold with a hydrophilic polymer having no copolymerizable functional group, virtually no chemical bond is formed, on the polymerization, at the adhesion interface between the hydrophilic polymer layer and the lens substrate and, on the succeeding plasma treatment, the activated points generated on the surface of the hydrophilic polymer layer can hardly react and bond with the underlying lens substrate. Consequently, the products obtained by this process (7) have poor adhesiveness between the hydrophilic polymer layer and the lens substrate, thereby tending to permit the hydrophilic polymer layer to be separated from the lens substrate, and thus have poor durability and are not usable in practice.

There has been proposed a process (8), belonging to a category separate from the above processes, which comprises, on producing molded articles in a mold by copolymerizing a monomer containing at least one silicone segment and at least one hydrophilic monomer, using the mold prepared from a copolymer of an α,β-olefin-type unsaturated mononitrile and at least one comonomer capable of enhancing the processability in the melted state, to provide the obtained molded articles with hydrophilic property (see Japanese Patent Tokuhyouhei 6-503276). With this process (8), it is considered, not so clearly though, that the hydrophilic monomer present near the mold surface migrates by diffusion, by the initial stage of polymerization at the latest, to be adsorbed on the nitrile groups present on the surface of the mold, so that the hydrophilic monomer is condensed on the mold surface, thereby forming the hydrophilic surface of the resulting contact lens.

However, in the products, such as contact lens, obtained by this process (8), the units from the hydrophilic monomer used are present inside the products, thereby impairing the performance originally possessed by the substrate silicone resin. As a result, in particular, the oxygen permeability of the contact lens and like items decrease. Furthermore, this process (8) has the disadvantage that the hydrophilic monomer usable for producing the molded articles is limited to one which is compatible with the counterpart monomer having at least one silicone segment.

SUMMARY OF THE INVENTION

Accordingly, an object of the present invention is to provide a high-quality molded polymer article having a hydrophilic surface and maintaining the performance of the polymer constituting the main body as it is, without being impaired, the article having on the surface of the main molded body a hydrophilic polymer layer having excellent uniformity, adhesiveness to the main body and durability and maintaining high hydrophilic property stably for a long period of time, even when put under external forces such as friction or contacted with chemicals.

Another object of the present invention is to provide a process for producing surely and smoothly the above molded polymer article having hydrophilic surface and the excellent characteristics.

Still another object of the present invention is to provide a mold which can be effectively used in the above process.

As a result of an extensive study to achieve the above objects, the present inventors have found that the following process can produce molded polymer articles having on the surface thereof a hydrophilic polymer layer having excellent uniformity, adhesiveness to the main molded body and durability. That is, the process comprises coating the surface, which is hydrophilic, of a mold with a monomer having a hydrophilic group, filling the mold with a polymerizable composition consisting essentially of a monomer and/or oligomer and conducting simultaneous molding and polymerization of the polymerizable composition and the monomer having a hydrophilic group. This process is thus far superior to the known processes (A) through (C), i.e. the above (1) through (4), which comprise preparing a lens-shaped article and then treating the surface to render it hydrophilic; the above (5), which comprises curing and shaping into a lens a previously produced polysiloxane and, simultaneously therewith, forming on the surface thereof a hydrophilic polymer layer by graft polymerization; the above (6) and (7), which comprise covering the surface of a mold with a hydrophilic polymer and then filling the mold with a polymerizable composition; and the above (8), which comprises using a mold comprising a copolymer of an α,β-olefin type unsaturated mononitrile.

The present inventors have also found that it is desirable, on producing the above molded polymer articles, to use a mold having a hydrophilic surface, in particular one obtained by molding polyvinyl alcohol. The present invention was completed based on the above findings.

The present invention provides a molded polymer article comprising a main molded body having on the surface thereof a hydrophilic polymer layer, the article being obtained by polymerizing both a monomer having a hydrophilic group and coated on the surface of a hydrophilic mold, and a polymerizable composition placed in the mold, said polymerizable composition consisting essentially of a monomer and/or oligomer having a functional group copolymerizable with the monomer having the hydrophilic group.

The present invention also provides a molded polymer article comprising a main molded body having on the surface thereof a hydrophilic polymer layer, the contact angle (θ) of water on the hydrophilic polymer layer present on the surface of the molded polymer article being less than 60° and the hydrophilic polymer layer satisfying the following condition (I):

$$\theta_1/\theta_0 \leq 1.25 \tag{I}$$

wherein $\theta_1$ represents a contact angle of water on the hydrophilic polymer layer present on the surface of the molded polymer article, the surface layer having been subject to an abrasion test comprising contacting, under a pressure of 1.3 g/cm$^2$, the surface layer to a stationary cow leather having an average surface roughness with respect to central line of 0.5 μm and rotating the molded polymer article at 500 rpm (at a linear velocity of contact point of 26 cm/sec) to a total of 5000 rotations; and $\theta_0$ represents a contact angle of water on the hydrophilic polymer layer present on the surface of the molded polymer article before the above abrasion test.

The present invention further provides a process for producing molded polymer articles, which comprises the steps of: (i) forming a coating layer of a monomer having a hydrophilic group on the surface of a mold having a hydrophilic surface; (ii) filling the mold on the surface of which the coating layer of the monomer having the hydrophilic group has been formed, with a polymerizable composition consisting essentially of a monomer and/or oligomer having a functional group copolymerizable with the monomer having the hydrophilic group; and (iii) polymerizing both the monomer having the hydrophilic group and the polymerizable composition.

The present invention still further provides a mold for producing molded polymer articles, said mold having a hydrophilic surface and being obtained by molding polyvinyl alcohol.

DETAILED DESCRIPTION OF THE PREFERRED EMBODIMENT

Hereinbelow the present invention is described in detail.

The molded polymer articles of the present invention include any molded article comprising a main molded body having on the surface thereof a hydrophilic polymer layer and being obtained by polymerizing both a monomer having a hydrophilic group and coated on the surface of mold having a hydrophilic surface, and a polymerizable composition placed in the mold, said polymerizable composition consisting essentially of a monomer and/or oligomer having a functional group copolymerizable with the monomer having the hydrophilic group.

The molded polymer articles of the present invention possess high hydrophilic property having excellent durability and, maintain good hydrophilic property for a long period of time, and do not lose or lower the hydrophilic property even when put under external forces such as friction or contacted with chemical agents.

The molded polymer articles of the present invention preferably have a contact angle ($\theta$) of water on the hydrophilic polymer layer present on their surface of less than 60°.

With the molded polymer articles of the present invention, it is more preferred that their hydrophilic polymer layer satisfy the following condition (I):

$$\theta_1/\theta_0 \leq 1.25 \qquad (I)$$

wherein $\theta_1$ and $\theta_0$ are as defined above.

The molded polymer articles of the present invention include any molded article, irrespective of how it has been produced, comprising a main molded body having on the surface thereof a hydrophilic polymer layer, the contact angle ($\theta$) of water on the hydrophilic polymer layer present on the surface of the main molded body being less than 60° and the hydrophilic polymer layer satisfying the above condition (I).

A contact angle $\theta$ of water on the hydrophilic polymer layer present on the surface of the main molded body of less than 60° realizes sufficient hydrophilic property and wettability of the molded polymer article, whereby the article can be used more effectively for various end-uses requiring hydrophilic property and wettability.

The above value of $\theta_1/\theta_0$ being not more than 1.25 gives better durability to the hydrophilic polymer layer present on the surface of the molded polymer article. In this case the hydrophilic property is maintained at a high level and does not diminish or decrease even when exposed to external forces such as friction.

With the molded polymer articles of the present invention, it is more desirable that the contact angle $\theta$ of water on the hydrophilic polymer layer present on the surface of the main molded body be not more than 40°, which provides still better hydrophilic property; and that the above $\theta_1/\theta_0$ value be as low as possible, which provides the hydrophilic polymer layer with still better durability.

On the other hand, contact lenses and similar molded articles with hydrophilic surfaces obtained by the above known processes mostly have a contact angle $\theta$ of water on their surface itself or, if any, the hydrophilic polymer layer on the surface thereof, of at least 60°, thus having insufficient hydrophilic property. In some cases, these molded articles may have this contact angle value of less than 60° at an initial stage just after their preparation, but they generally have a $\theta_1/\theta_0$ value of more than 1.25, which means poor durability, so that the original hydrophilic property tends to be lost by action of external forces such as friction. By this point, the molded polymer articles of the present invention are clearly distinguished from the known molded polymer articles, such as conventional contact lenses having a hydrophilic surface.

With the molded polymer articles of the present invention, it is desirable that the hydrophilic polymer layer present on their surface have a thickness of 0.005 to 10 µm, in view of the uniformity of the layer, easy formation of the layer on the main molded body, prevention of delamination or separation of the layer from the main body and durability. The thickness is more preferably in a range of 0.01 to 1 µm.

The molded polymer articles of the present invention may have a hydrophilic polymer layer on either the entire surface or part of the surface thereof. It is recommended to permit the hydrophilic polymer layer to be present on the surface of a molded polymer article where the hydrophilic property is needed according to the type, shape, use and the like of the molded polymer article. Where the molded polymer articles of the present invention are contact lenses, intraocular lenses and the like, it is preferred that they have the hydrophilic polymer layer on their entire surface.

The molded polymer articles of the present invention may have any shape or structure, with no specific limitation, and the shape or structure can be suitably selected according to the end-use and the like. The molded polymer articles of the present invention may be applied to any end-use, with no specific limitation either. Examples of applicable end-uses are general industrial items, living necessaries, medical products, and articles for agricultural and marine uses. Among these uses, the molded polymer articles are suitable as medical products, such as artificial organs, catheters, intraocular lenses, contact lenses and dental materials, in particular as contact lenses and intraocular lenses.

Where the molded polymer article of the present invention is, for example, a contact lens made of silicone resin, the lens has a main lens body of silicone resin, which is hydrophobic, and has, on the surface thereof, the above-described hydrophilic polymer layer having excellent adhesiveness to the main body and durability. As a result, the lens can prevent itself from sticking to cornea and secure sharp visual acuity, while exhibiting excellent comfort during wear and oxygen permeability. The lens cannot be soiled easily and have excellent durability.

The molded polymer articles of the present invention can be smoothly produced by the process of the present invention, which comprises the steps of: (i) forming a coating layer of a monomer having a hydrophilic group on the surface of a mold having a hydrophilic surface; (ii) filling the mold on the surface of which the coating layer of the monomer having the hydrophilic group has been formed, with a polymerizable composition consisting essentially of a monomer and/or oligomer having a functional group copolymerizable with the monomer having the hydrophilic group; and (iii) polymerizing both the monomer having the hydrophilic group and the polymerizable composition.

As the "mold having a hydrophilic surface" herein, molds having a contact angle of water, as measured by sessile drop method, on at least part of the mold surface of less than 60° are preferably used. If the water contact angle on the mold surface is not less than 60°, the mold surface will show some hydrophobic property, so that the monomer having a hydrophilic group used in the invention poorly wets the mold surface and cannot be applied uniformly on the mold surface. In this case, in addition, weak adsorption of the monomer having a hydrophilic group to the mold surface causes, in the succeeding step, the monomer to diffuse into a polymerizable composition consisting essentially of a monomer and/or oligomer casted in the mold. As a result, the obtained molded polymer article often has no or very decreased amount of hydrophilic coating layer remaining on its surface.

The mold used in the invention may have "a hydrophilic surface" on its entire surface or part of its surface, and is suitably selected according to the use and the like of the intended molded polymer article. In the present invention, there are no specific restrictions with respect to the shape, type and the like of the mold used, but it is desirable to use a mold consisting of a plurality of parts, which allows easy taking out of the obtained molded articles. In this case, as described above, either each of the parts may be entirely hydrophilic or part that contacts the molded articles, of each of the parts may be hydrophilic.

The mold used in the invention may be formed of any material, insofar as it can realize a mold surface having a water contact angle of less than 60° and the resulting mold can permit smooth molding and polymerization of the monomer having a hydrophilic group and polymerizable composition used.

Examples of materials that can realize a mold surface having a water contact angle of less than 60° and are hence preferably usable in the present invention are polymers, e.g. polyvinyl alcohol (water contact angle: 38°), polyacrylonitrile (44°), polymethyl acrylate (52°), cellulose acetate (53°) and vinyl chloride-vinyl acetate copolymer (55°); metals having a water contact angle of less than 60°, e.g. iron, copper, zinc, tin, nickel, cobalt, chromium, titanium, gold, platinum, silver and alloys of the foregoing; and ceramics having a water contact angle of less than 60°, e.g. soda glass, borosilicate glass, fused quartz, alumina and zirconia.

Besides molds from the above raw materials, any mold having a hydrophilic surface is usable in the present invention. For example, those principally made of a hydrophobic material but having modified the surface hydrophilic by post-treatment are also usable. Concrete examples are molds from hydrophobic polymers, e.g. polyethylene, polypropylene and polyethylene terephthalate, whose surface has been rendered hydrophilic by chemical treatment with an acid or alkali, plasma treatment, chemical plating or the like; and molds from hydrophobic ceramics, e.g. silicon carbide and silicon nitride, whose surface has been rendered hydrophilic by forming an oxidation coating by plasma CVD treatment.

Among the above, molds made of polyvinyl alcohol are preferably used in the present invention. These molds, having a contact angle of water on the mold surface is, as described above, 38° or so, are highly hydrophilic (wettable), so that monomers having a hydrophilic group can easily wet the mold surface. Furthermore, a mold comprising a water-soluble polyvinyl alcohol, which itself is soluble in water, is usable as the polyvinyl alcohol mold. In this case, on completion of preparation (polymerization and molding) of a molded polymer article in the mold, the mold as it is containing the molded polymer article can be placed in water to recover the molded polymer article having tightly adhered to the inside of the mold, without being damaged, because the mold dissolves and disappears then.

Polyvinyl alcohols generally start to decompose at their melting points, thereby being difficult to undergo melt molding, such as injection molding and extrusion molding. However, polyvinyl alcohols having a relatively low degree of polymerization and a relatively low degree of saponification (typically, degree of polymerization: 200 to 1000; degree of saponification: 50 to 90%) are melt moldable, i.e. injection moldable and extrusion moldable. By conducting melt molding, such as injection molding or extrusion molding, of these special polyvinyl alcohols, molds having a hydrophilic mold surface can be effectively produced.

In the process of the present invention, the above mold surface having a hydrophilic property is coated with a monomer having a hydrophilic group. Examples of the monomer having a hydrophilic group used in the invention are those having one or more proton-donating group, e.g. hydroxyl group, carboxyl group, sulfonic acid group and phosphoric acid group; proton-accepting group, e.g. amino group and imino group; ionic hydrophilic group, e.g. quaternary ammonium group, carboxylate anion group and sulfonate anion group; or other hydrophilic groups, e.g. amide group and polyoxyethylene group; and, at the same time, having at least one polymerizable carbon-carbon double bond.

Examples of monomers having a hydrophilic group and preferably used in the invention are 2-hydroxyethyl (meth) acrylate, 2-hydroxypropyl (meth)acrylate, 12-hydroxydodecyl (meth)acrylate, glycerine mono(meth) acrylate, glycerine di(meth)acrylate, (meth)acrylic acid, mono{2-(meth)acryloyloxyethyl}succinate, mono{2-(meth) acryloyloxyethyl}maleate, mono{2-(meth) acryloyloxyethyl}phthalate, 2-(meth)acryloyloxyethyl dihydrogen phosphate, 10-(meth)acryloyloxydecyl dihydrogen phosphate, bis{2-(meth)acryloyloxyethyl}hydrogen phosphate, (meth)acrylamide, N-methylol(meth) acrylamide, N,N'-methylenebis(meth)acrylamide, 2-acrylamide-2-methylpropanesulfonic acid and its alkali metal salts, 2-aminoethyl (meth)acrylate, N,N-dimethylaminoethyl (meth)acrylate, 4-(meth) acryloyloxybutyltrimethylammonium chloride, 2-hydroxy-3-(meth)acryloyloxypropyltrimethylammonium chloride, 2-(meth)acryloyloxyethylphosphoryl choline, 6-(meth) acryloyloxyhexylphosphoryl choline, 10-(meth) acryloyloxydecylphosphoryl choline, polyethylene glycol mono(meth)acrylate, polyethylene glycol di(meth)acrylate, N-vinylpyrrolidone, N-vinylcaprolactam, N-vinyloxazolidone, N-vinylsuccinimide, 2-hydroxyethyl vinyl ether, allyl 2-hydroxyethyl ether, allylphosphoryl choline, decenylphosphoryl choline, sodium styrenesulfonate, cinnamic acid and p-vinylbenzoic acid.

These monomers having a hydrophllic group can be used, in the present invention, either singly or in combination of 2 or more.

Use of, among the above monomers, for example, monomers having phosphoryl group leads to production of molded polymer articles having excellent biocompatibility and those having an ionic group to that of molded polymer articles having still better hydrophilic surface.

Further in the present invention, in combination with the above monomers having a hydrophilic group other monomers and/or oligomers copolymerizable with these monomers may, as necessary, be used within such a limit as not to impair the purpose and effect of the invention. In this case, the coating on a mold surface is generally carried out by using a monomer composition comprising the monomer having a hydrophilic group and the other monomer and/or oligomer.

Examples of other monomers usable in combination with the monomer having a hydrophilic group are monofunctional monomers, e.g. methyl (meth)acrylate, butyl (meth) acrylate, benzyl (meth)acrylate, glycidyl (meth)acrylate, tetrahydrofurfuryl (meth)acrylate, 3-methacryloyloxypropyltris(trimethylsiloxy)silane, vinyl pivalate, vinyl caprylate and vinyl benzoate; and multifunctional monomers, e.g. ethylene glycol di(meth)acrylate, triethylene glycol di(meth)acrylate, glycerine tri(meth) acrylate, pentaerythritol tetra(meth)acrylate, and divinyl adipate. Examples of oligomers usable in combination with the monomer having a hydrophilic group are those acrylic-based oligomers, vinyl ester-based oligomers and silicone-based oligomers that have at least one polymerizable group.

Where coating of a mold is carried out with a monomer composition comprising a monomer having a hydrophilic group and other monomer and/or oligomer, it is desirable that the ratio of the other monomer and/or oligomer (when both are used, sum of both) to the total of all monomers and oligomer in the monomer composition be not more than 90 mole %, more preferably not more than 80 mole %, and most preferably not more than 60 mole %. If the ratio of other the monomer and/or oligomer exceeds 90 mole %, the surface of the obtained molded polymer article will have insufficient hydrophilic property.

In particular, where the molded polymer article is a contact lens, it is desirable that the water contact angle on the surface be less than 60° in view of wettability and like properties, and a water contact angle of not less than 60° tends to cause troubles such as clouding of lens and poor comfort during wear. It becomes therefore necessary to select the type of the monomer or composition of the monomer composition to coat the mold surface, such that the resulting lens surface has a water contact angle of less than 60°.

The monomer having a hydrophilic group or monomer composition comprising it (hereinafter simply referred to as "monomer having a hydrophilic group", inclusively) may contain a small amount of a polymerization initiator, to polymerize (copolymerize), in the succeeding step, with a polymerizable composition placed in a mold.

Examples of polymerization initiators usable for this purpose are heat polymerization initiators, e.g. azobisisobutyronitrile, azobisdimethylvaleronitrile and benzoyl peroxide; and photopolymerization initiators, e.g. benzoin methyl ether, benzophenone, 2,3-pentanedione, camphorquinone, 2-methylthioxanthone and 2,4,6-trimethylbenzoyldiphenylphosphine oxide.

These polymerization initiators are preferably used in an amount of, generally, 0.01 to 10 parts by weight based on 100 parts by weight of the monomer having a hydrophilic group.

In coating a mold surface with a monomer having a hydrophilic group, any process capable of uniformly applying the monomer having a hydrophilic group on the mold surface can be employed, with no specific limitation. For a monomer having a hydrophilic group and having the form of a solid or highly viscous liquid, which is difficult to handle, it is desirable to dilute the monomer with a solvent. Examples of solvents usable for this purpose are water, alcohols, ketones, carboxylic acid esters, ethers, dimethyl sulfoxide and dimethylformamide. These solvents may be used singly or in combination of 2 or more.

Examples of the process for coating a mold surface with a monomer having a hydrophilic group are one which comprises immersing the mold in the monomer having a hydrophilic group or in a diluted solution thereof; and one which comprises spraying the monomer or diluted solution thereof to the mold surface or conducting spin-coating with the monomer or diluted solution thereof. Where a liquid obtained by diluting a monomer having a hydrophilic group in a dilution solvent is used for the coating of the mold surface, the solvent is dried off after the coating.

Where it is desired to form a mono-molecular layer of a monomer having a hydrophilic group on the surface of a mold, a preferred procedure comprises coating the mold surface and then wash off with an appropriately selected solvent an excess monomer having a hydrophilic group that has not been directly adsorbed on the mold surface.

It is desirable that the thickness of the coating layer after drying (after removal of solvent) on the mold surface be, generally, in a range of 0.005 to 10 $\mu$m, more preferably 0.01 to 1 $\mu$m and uniform throughout the coated surface. Immersion process or spraying process is suitably used for the purpose of achieving the above conditions. The thickness of the layer can be adjusted by controlling the ratio of dilution of the monomer having a hydrophilic group with a solvent or by controlling the amount applied.

The coating of the mold surface with a monomer having a hydrophilic group can be carried out either before assembly of the mold (when the parts constituting the mold are separately present) or after the assembly. In either case, it is necessary to apply the monomer having a hydrophilic group to the part of the surface of the mold that corresponds to the part of the surface of the resulting molded polymer article, on which the hydrophilic polymer layer is desired to be formed.

After the above step of coating the mold surface with a monomer having a hydrophilic group, the mold is filled with a polymerizable composition having a functional group copolymerizable with the monomer having a hydrophilic group and having been applied to the mold surface (hereinafter sometimes simply referred to as "polymerizable composition").

The polymerizable composition to fill the mold, which will form the main body of the resulting molded polymer article, may be suitably selected according to the end-use and the like of the molded article. It is essential that the monomer and/or oligomer constituting the polymerizable composition copolymerize with the monomer having a hydrophilic group and coating the mold surface. Monomers and/or oligomers having a vinyl group are therefore preferably used for this purpose.

Examples of monomers usable for the polymerizable composition are alkyl (meth)acrylates, e.g. methyl (meth) acrylate, butyl (meth)acrylate, 2-ethylhexyl (meth)acrylate and lauryl (meth)acrylate; siloxanyl (meth)acrylates, e.g. trimethylsilylmethyl (meth)acrylate, trimethylsilylpropyl (meth)acrylate, methylbis(trimethylsiloxy)silylpropyl (meth)acrylate, tris(trimethylsiloxy)silylpropyl (meth) acrylate and mono[methylbis(trimethylsiloxy)siloxy]-bis (trimethylsiloxy)silylpropyl (meth)acrylate; siloxanyl (meth)acrylamides, e.g. N-[tris(trimethylsiloxy)silyl]propyl (meth)acrylamide and N-methyl-N-[tris(trimethylsiloxy) silyl]propyl (meth)acrylamide; fluoroalkyl (meth)acrylates, e.g. 2,2,2-trifluoroethyl (meth)acrylate, 2,2,2-trifluoro-1-trifluoromethylethyl (meth)acrylate, 2,2,3,3,4,4,5,5-octafluoropentyl (meth)acrylate and 2,2,3,3,4,4,5,5,6,6,7,7-dodecafluoroheptyl (meth)acrylate; vinyl esters, e.g. vinyl acetate, vinyl pivalate, vinyl caproate, vinyl caprate and vinyl benzoate; fumaric acid diesters and maleic acid diesters.

Examples of oligomers usable for the polymerizable composition are those silicone oligomers, urethane oligomers, silicone-urethane oligomers, butadiene oligomers and (meth)acrylate oligomers that have at least one polymerizable group.

The polymerizable composition may, as necessary, contain, as crosslinking agent, a suitable amount of a multi-functional monomer, e.g. ethylene glycol di(meth)acrylate, triethylene glycol di(meth)acrylate, polyethylene glycol di(meth)acrylate, pentaerythritol tetra (meth)acrylate, and divinyl adipate.

The polymerizable compsition may, further as necessary and within limits not to impair the purpose and effect of the present invention, contain various additives such as antioxidant, coloring agent, ultra-violet absorber, weatherability improver, lubricant and flame retardent.

In the present invention, the polymerizable composition may be prepared by using, according to the end-use and the like of the resulting molded polymer articles, one or at least two of the above monomers and oligomers and, when occasions demand, one or more of the above crosslinking agents.

Where the molded polymer articles are for example medical products, in particular contact lens, the polymerizable composition is suitably prepared from one or more of the silicon compounds, e.g. siloxanyl (meth)acrylate, siloxanyl (meth)acrylamide and silicone oligomers, to obtain contact lenses with high oxygen permeability.

The polymerizable composition used desirably contains a suitable amount of a polymerization initiator, which insures smooth polymerization in the mold. Examples of polymerization initiators usable for this purpose are heat polymerization initiators, e.g. azobisisobutyronitrile, azobisdimethylvaleronitrile and benzoyl peroxide; and photopolymerization initiators, e.g. benzoin methyl ether, camphorquinone, 2-methylthioxanthone and 2,4,6-trimethyl-diphenylbenzoylphosphine oxide.

These polymerization initiators are preferably used in an amount of 0.01 to 10 parts by weight based on 100 parts by weight ot the polymerizable composition.

In order to provide the resulting desired molded polymer articles with high dimensional precision (molding precision), it is desirable to prepare the polymerizable composition such that its polymerization contraction will become not more than 10%. To this end, it is recommended to select the type of the monomer or oligomer used or adjust the composition of the polymerizable composition, such that the average molecular weight per vinyl group contained in the entire polymerizable composition will become 200 or more.

After a mold has been filled with a polymerizable composition, both of the monomer having a hydrophilic group and having been applied on the mold surface and the polymerizable composition placed in the mold are polymerized and, at the same time, molded. If the polymerizable composition used is capable of polymerizing by itself, with no need for receiving energy from outside, such as heat or light, simple filling of a mold with the polymerizable composition could effect polymerization and molding. In general, however, the polymerizable composition is placed in a mold and then subjected to exposure to energy to start polymerization (copolymerization), together with the monomer having a hydrophilic group and applied to the mold surface, to form the molded polymer articles having a hydrophilic polymer layer of the present invention.

It is recommended to give energy from outside, to polymerize (copolymerize) both the monomer having a hydrophilic group and applied to the mold surface and the polymerizable composition placed in the mold, as follows. For the monomer having a functional group and/or polymerizable composition used containing a heat polymerization initiator, they are heated with warm air, hot air, warm water, hot water, radiation heat, microwave or the like. For the monomer having a functional group and/or polymerizable composition used containing a photopolymerization initiator, they are irradiated with ultraviolet light, visible light or the like. For the monomer having a functional group and/or polymerizable composition used containing both a heat polymerization initiator and photopolymerization initiator, they are subjected to exposure to both of the above heating and irradiation.

On polymerization by light irradiation, it is necessary to use a transparent or translucent mold, in order to permit the irradiated light to reach the inside of the mold.

Where the polymerization is effected by heating, the temperature is generally in a range of 50 to 120° C., although it may vary depending on the types of the polymerization initiator, the monomer having a hydrophilic group and the monomer or oligomer constituting the polymerizable composition, the material of the mold used, the shape and size of the intended molded polymer articles and other factors.

In conducting polymerization by light irradiation, there can be used, for example, high-pressure mercury lamp, low-pressure mercury lamp, xenon lamp, halogen lamp and metal halide lamp.

Then, the polymerization in the mold proceeds and after some time the molded polymer article in the mold will have such a dimensional stability that it does not undergo permanent deformation by external forces. Thereafter, the molded polymer article is taken out from the mold. If the molded polymer article has adhered to the mold tightly and cannot be readily separated therefrom, there can be used separation means such as vibration by ultrasonic wave, heat shock or exposure to steam. Where a mold prepared from a water-soluble polyvinyl alcohol is used, as described above, the molded polymer article can be obtained by immersing the mold with the polymer article in water and dissolving off the mold.

In the present invention, there occurs almost simultaneous polymerization of the coating layer, which is present on the mold surface, of a monomer having a hydrophilic group and a polymerizable composition which will form the main body of the resulting molded polymer article. As a result, both parts firmly bond together thanks to the covalent bond tightly formed by their copolymerization at the interface, so that a hydrophilic polymer layer is formed on the surface of the main body of the molded polymer article. This layer is durable and cannot be delaminated or separated from the main body by action of external forces such as friction or of chemicals. On the formation of the hydrophilic polymer layer, the layer thickness can be suitably adjusted according to the use and type of the molded polymer article, but the thickness is, as described before, preferably in a range of 0.005 to 10 $\mu$m, more preferably in a range of 0.01 to 1 $\mu$m. The presence and thickness of the hydrophilic polymer layer can be checked by cross-sectional observation in a transmission electron microscope or by surface analysis such as X-ray photoelectron spectroscopy or secondary ion mass spectrometry.

On the other hand, both of the above known process (A), which comprises activating the surface of a previously obtained molded polymer article by discharge treatment or like means and then graft-polymerizing a monomer having a hydrophilic group on the surface, and the above known process (B), which comprises curing a polymer and shaping the polymer into a contact lens and, at the same time, graft-polymerizing a monomer having a hydrophilic group on the polymer surface, lead to a low ratio of grafting of the monomer having a hydrophilic group to the surface of the molded article, so that the hydrophilic layer is very thin and weak. Likewise, with the above known process (C), which comprises covering the surface of a mold with a hydrophilic polymer, filling the mold with a polymerizable monomer and then conducting molding and, simultaneously therewith, forming a layer of the hydrophilic polymer on the surface of the molded polymer article, the bond strength between the hydrophilic polymer layer and the main body of the molded polymer article is lower as compared with the molded polymer articles of the present invention.

The molded polymer articles of the present invention, having on the surface thereof a uniform hydrophilic polymer layer having excellent adhesiveness to the main body and durability, can maintain stably the original high hydrophilic property at a good level for a long period of time and even when exposed to external forces such as friction or contacted with chemical agents.

The molded polymer articles of the present invention can be effectively used for various end-uses requiring that at least part of the surface of the article used be hydrophilic. Examples of such uses are general industrial items, living necessaries, medical products, and articles for agricultural and marine uses. Among these uses, the molded polymer articles of the present invention are suitable as medical products, such as artificial organs, catheters, intraocular lenses, contact lenses and dental materials, in particular as contact lenses and intraocular lenses.

Where the molded polymer article according to the present invention is, for example, a contact lens made of silicone resin, the lens has a main lens body of silicone resin and, on the surface thereof, the above-described hydrophilic polymer layer having excellent adhesiveness to the main body and durability. As a result, the lens can prevent itself from sticking to cornea and secure sharp visual acuity, while exhibiting excellent comfort during wear and oxygen permeability. The lens cannot be soiled easily and have excellent durability.

The process of the present invention can very smoothly and surely produce the above molded polymer article having a hydrophilic surface and excellent characteristics.

The polyvinyl alcohol mold preferably used in the process of the present invention for producing the molded polymer articles has a surface with high hydrophilic property and can hence permit a coating layer of a monomer having a hydrophilic group to form on its surface in a good condition and, besides, can be effectively produced by melt molding such as injection molding or extrusion molding. In particular, where a water-soluble polyvinyl alcohol is used to prepare the polyvinyl alcohol mold, immersion of the mold, after polymerization and molding in the mold have been completed, as it is with the polymer article contained therein, in water permits the molded polymer article to be recovered in a good condition and without damage, since the mold is dissolved and disappears in water.

EXAMPLES

Other features of the invention will become apparent in the course of the following detailed descriptions of exemplary embodiments which are given for illustration of the invention and are not intended to be limiting thereof. In the Examples and Comparative Examples that follow, evaluation of the hydrophilic property (test of the contact angle of water) of the surface of a mold and the surface of a molded polymer article and evaluation of the durability of the hydrophilic layer (hydrophilic polymer layer) of a molded polymer article were made according to the following methods.

(1) Evaluation of the Hydrophilic Property (Test of the Contact Angle of Water) of the Surface of a Mold and the Surface of a Molded Polymer Article The surface of a mold or molded polymer article is washed with water and/or organic solvent. The surface is set on a contact angle meter (CA-P type, made by Kyowa Kaimen Kagaku KK). Purified water is dropped through a microsyringe onto the surface and the angle formed by the gas/liquid interface with the surface is measured. An average of 5 measurements is taken as the contact angle ($\theta$).

(2) Evaluation of the Durability of the Surface of a Molded Polymer Article (Abrasion Test)

A test specimen (molded polymer article itself or specimen taken therefrom) is fixed on the center of a disk that can rotate about its central axis. An abrasion mass of loop-form made of cow leather having a width of 5 mm (loop diameter 9.6 mm; average roughness with respect to central line of the surface contacting the surface of specimen: 0.5 $\mu$m) is fixed above a place 5 mm apart from the center of the disk. The test specimen together with the disk is pressed against the abrasion mass from beneath it under a load of 1.3 g/cm$^2$ so that the surface of the specimen contacts the abrasion mass under the pressure. The disk is rotated 5000 times at 500 rpm (at a linear velocity at contact point of 26 cm/sec) for 10 minutes to cause sliding friction between the specimen surface and the abrasion mass. The contact angle of water on the surface of the specimen is measured before ($\theta_1$) and after ($\theta_0$) the abrasion test. Evaluation is made as: the larger the value of $\theta_1/\theta_0$ (the larger the contact angle ($\theta_1$) after abrasion), the worse the durability of the specimen surface.

Example 1

(1) A borosilicate glass plate (length×width×thickness=50 mm×50 mm×3 mm) washed with an alkali solution (saturated potassium hydroxide solution in isopropanol), which constituted a mold plate and had a water contact angle of 0°) was immersed in a 30% 2-methacryloyloxyethylphosphoryl choline (hereinafter referred to as MPC) solution in isopropanol. The plate was vertically pulled up at a rate of 5 mm/sec and then air dried, to form a coating layer of MPC on the glass plate.

(2) The glass plate coated with MPC obtained in (1) above was horizontally placed with the MPC coating surface facing upward and a square mold frame made of teflon (inner size: length×width×depth=25 mm×25 mm×3 mm) was placed on the plate, to form an open mold.

(3) Separately, 12 g of methacryloyloxypropyltrimethoxysilane, 3 g of 0.5N hydrochloric acid and 5 g of ethanol were mixed and reacted at 25° C. for 3 days. Thereafter, 0.2 g of α,α'-azobisisobutyronitrile was added and ethanol and water were removed under reduced pressure, to yield a silicone oligomer composition (polymerizable composition).

(4) The silicone oligomer composition obtained in (2) above was poured into the mold prepared in (2) above until the mold cavity was filled fully, and heated at 60° C. for 20 hours under argon stream, to give a colorless transparent cured polymer.

(5) The polymer obtained in (4) above was, as it was contained in the mold, immersed in water for one day and then taken out from the mold, to give a molded polymer article.

(6) The molded polymer article obtained in (5) above was tested for the water contact angle, to show that the surface having not contacted with the glass plate (surface corresponding to the open part of the mold) had a contact angle of 82° and the surface having contacted with the glass plate had a contact angle of 38°.

(7) The surface having contacted the glass plate (mold) and having shown a contact angle of 38° of the molded polymer article obtained in (5) above was wiped once with gauze impregnated with isopropanol and then tested for the water contact angle again. The result was 38°, that is, no change.

(8) The molded polymer article obtained in (5) above was immersed in isopropanol at a temperature of 25° C. and subjected to ultrasonic wave treatment for 10 minutes, and taken out. Thereafter, the surface having contacted with the glass plate (mold) was tested for the water contact angle again, to show 38°, thus showing no change.

(9) The molded polymer article obtained in (5) above was allowed to stand in air for 2 months and then the surface having contacted with the glass plate (mold) was tested for the water contact angle again, to show 38°, thus showing no change.

(10) The molded polymer article obtained in (5) above was subjected to an abrasion test according to the above method. The surface of the molded polymer article after the abrasion test showed a water contact angle of 38° ($\theta_1/\theta_0=1.0$). This result shows that no decrease in the hydrophilic property (wettability) occurred after the abrasion test and that the hydrophylic polymer layer formed on the surface of the molded polymer article has very high adhesiveness to the main body of the molded polymer article and has very high durability.

(11) The results of Example 1 show the following facts. With the molded polymer article of the present invention obtained by the process which comprises forming a coating layer of a monomer having a hydrophilic group on the surface of a hydrophilic mold (surface of a glass plate), filling the mold with a polymerizable composition and then polymerizing (copolymerizing) the monomer having a hydrophilic group and the polymerizable composition, a hydrophilic polymer layer having a very small water contact angle, i.e. very high hydrophilic property (wettability) is formed on the molded polymer article and, moreover, the hydrophilic polymer layer has excellent durability and adhesiveness to the main body of the molded polymer article, thereby causing no delamination or separation and maintaining the surface of the molded polymer article at a high level of hydrophilic property for a long period of time.

Example 2

(1) A square plate made of a water-soluble polyvinyl alcohol (POVAL CP-1000; made by Kuraray Co., Ltd.) (hereinafter referred to as "square PVA plate" (length×width×thickness=50 mm×50 mm×3 mm), which constituted a mold plate and had a water contact angle of 38°) was immersed in a 30% MPC solution in isopropanol. The plate was vertically pulled up at a rate of 5 mm/sec and then air dried, to form a coating layer of MPC on the square PVA plate.

(2) The square PVA plate coated with MPC obtained in (1) above was horizontally placed with the MPC coating surface facing upward and the same teflon mold frame as used in Example 1 was placed on the plate, to form an open mold. The mold was filled to the top with a polymerizable composition prepared by incorporating 0.1% by weight of benzoin methyl ether into an oligomer comprising polydimethylsiloxane having a degree of polymerization of 58 and having bound, to both ends thereof, methacryloyloxypropyl-dimethylsilyl groups (hereinafter this oligomer is referred to as "MPPS-60").

(3) The mold filled with the polymerizable composition was placed in a sealed quartz container. After the air inside the container had been completely replaced with argon, ultraviolet light was irradiated with high-pressure mercury lamp (120 W) from 10 cm above the open side (opposite to the square PVA plate) for 20 minutes, to effect photopolymerization to obtain a polymer.

(4) The polymer obtained in (3) above was, as it was contained in the mold, immersed in water for one day and then taken out from the mold, to give a molded polymer article.

(5) The molded polymer article obtained in (5) above was tested for the water contact angle, to show that the surface having contacted with the glass plate had a contact angle of 40°. The surface having not contacted with the square PVA plate (mold), i.e. surface corresponding to the open part of the mold had a contact angle of 96°.

(6) The molded polymer article obtained in (4) above was subjected to the abrasion test according to the above method. The surface of the molded polymer article after the abrasion test showed a water contact angle of 39° ($\theta_1/\theta_0=0.98$).

Example 3

(1) Example 2 was repeated except that the square PVA plate was changed to a stainless steel plate (length×width×thickness=50 mm×50 mm×3 mm; water contact angle: 49°), to obtain a molded polymer article.

(2) The molded polymer article obtained in (1) above was tested for the water contact angle, to show that the surface having contacted with the stainless steel plate had a contact angle of 51°. The surface having not contacted with the stainless steel plate (open part), had a contact angle of 96°, which was the same as in Example 2.

(3) The molded polymer article obtained in (1) above was subjected to the abrasion test according to the above method. The surface of the molded polymer article after the abrasion test showed a water contact angle of 46° ($\theta_1/\theta_0=0.90$).

Comparative Example 1

(1) Example 2 was repeated except that the square PVA plate was not coated with MPC to prepare an open mold, to obtain a molded polymer article.

(2) The molded polymer article obtained in (1) above was tested for the water contact angle, to show that the surface having contacted with the square PVA plate had a contact angle of 98°. This result shows that the article had almost no hydrophilic property (wettability) at all.

Comparative Example 2

(1) Example 2 was repeated except that the square PVA plate was changed to a square polyethylene terephthalate plate (length×width×thickness=50 mm×50 mm×3 mm; contact angle of water: 64°), to obtain a molded polymer article.

(2) The molded polymer article obtained in (1) above was tested for the water contact angle, to show that the surface having contacted with the square polyethylene terephthalte plate had a contact angle of 63°. It is understood from the result of this Comparative Example 2, that even when a mold coated on the surface thereof with a monomer having a hydrophilic group is used and filled with a polymerizable composition, and polymerization of both of the monomer having a hydrophilic group and coating the mold surface and the polymerizable composition is carried out at the same time, the non-hydrophilic feature of the mold surface coated with the monomer having a hydrophilic group does not permit a hydrophilic polymer layer to be smoothly formed on the surface of the resulting molded polymer article, thereby failing to provide the molded polymer article with high hydrophilic surface.

Comparative Example 3

(1) Example 2 was repeated except that the square PVA plate was changed to a square teflon plate (length×width× thickness=50 mm×50 mm×3 mm; contact angle of water: 104°), to obtain a molded polymer article.

(2) The molded polymer article obtained in (1) above was tested for the water contact angle, to show that the surface having contacted with the square teflon plate had a contact angle of 63°. It is also understood from the result of this Comparative Example 3, that even when a mold coated on the surface thereof with a monomer having a hydrophilic group is used, the mold is filled with a polymerizable composition and polymerization of both of the monomer having a hydrophilic group and coating the mold surface and the polymerizable composition is carried out at the same time, the non-hydrophilic feature of the mold surface coated with the monomer having a hydrophilic group does not permit a hydrophilic polymer layer to be smoothly formed on the surface of the resulting molded polymer article, thereby failing to provide the molded polymer article with high hydrophilic surface.

Example 4

(1) The procedure of Example 2 (1) was followed except that 2,3-dihydroxypropyl methacrylate was used instead of MPC, to form a coating layer of 2,3-dihydroxypropyl methacrylate on the surface of the square PVA plate.

(2) The square PVA plate coated with 2,3-dihydroxypropyl methacrylate was used, to obtain a molded polymer article in the same manner as in Example 2.

(3) The molded polymer article obtained in (2) above was tested for the water contact angle, to show that the surface having contacted with the square PVA plate had a contact angle of 43°.

(4) The molded polymer article obtained in (2) above was subjected to the abrasion test according to the above method. The surface of the molded polymer article after the abrasion test showed a water contact angle of 44° ($\theta_1/\theta_0=1.02$).

Example 5

(1) The procedure of Example 2 (1) was followed except that the 30% MPC solution in isopropanol was replaced with 2-hydroxypropyl methacrylate (not diluted), to form a coating layer of 2-hydroxypropyl methacrylate on the surface of the square PVA plate.

(2) The square PVA plate coated with 2-hydroxypropyl methacrylate was used, to obtain a molded polymer article in the same manner as in Example 2.

(3) The molded polymer article obtained in (2) above was tested for the water contact angle, to show that the surface having contacted with the square PVA plate had a contact angle of 50°.

(4) The molded polymer article obtained in (2) above was subjected to the abrasion test according to the above method. The surface of the molded polymer article after the abrasion test showed a water contact angle of 50*20 ($\theta_1/\theta_0=1.0$).

Example 6

(1) The procedure of Example 2 (1) was followed except that the borosilicate glass plate used in Example 1 was used instead of the square PVA plate and that a 10% solution of sodium 2-acrylamide-2-methylpropanesulfonate in methanol was used instead of the 30% MPC solution in isopropanol, to form a coating layer of sodium 2-acrylamide-2-methylpropanesulfonate on the surface of the borosilicate glass plate.

(2) The borosilicate glass plate having a coating layer of sodium 2-acrylamide-2-methylpropanesulfonate was used, to obtain a molded polymer article in the same manner as in Example 2.

(3) The molded polymer article obtained in (2) above was tested for the water contact angle, to show that the surface having contacted with the borosilicate glass plate had a contact angle of 38°.

(4) The molded polymer article obtained in (2) above was subjected to the abrasion test according to the above method. The surface of the molded polymer article after the abrasion test showed a water contact angle of 36° ($\theta_1/\theta_0=0.95$).

Example 7

(1) A water-soluble PVA for melt molding (POVAL CP-1000; made by Kuraray Co., Ltd.) was injection molded into molds for cast polymerization. The molds consisted of a convex mold and concave mold, which had been designed such that engagement with each other would form a closed mold cavity corresponding to a disk having a radius of 15 mm and a thickness of 0.5 mm.

(2) The convex and concave molds obtained in (1) above were each immersed in a 30% MPC solution in isopropanol, then pulled up gradually and dried under a dry nitrogen atmosphere, to be coated on the surface thereof with MPC.

(3) Separately, 20 g of MPPS-60, 5 g of tert-butyl methacrylate and 0.05 g of 2,4,6-trimethylbenzoylphenylphosphine oxide were mixed to give a photopolymerizable composition.

(4) The photopolymerizable composition prepared in (3) above and degassed was poured into the concave mold coated with MPC in (2) above. This was engaged with the convex type under an argon atmosphere and closed. The mold was placed at a point 10 cm just under a high-pressure mercury lamp (120 W) and ultraviolet light was irradiated for 1 hour, to effect polymerization.

(5) The polymer obtained in (4) above was, as it was contained in the mold, immersed in water for one day. Then the PVA mold was dissolved off and a transparent disk-shaped molded polymer article having a radius of 14.5 mm and a thickness of 0.5 mm was recovered.

(6) The surface of the molded polymer article obtained in (5) above was washed thoroughly with water flow, to remove completely the PVA having adhered to the surface.

(7) The molded polymer article obtained in (6) above was tested for the water contact angle, to show that the surface had a contact angle of 38°.

(8) The molded polymer article obtained in (6) above was subjected to the abrasion test according to the above method. The surface of the molded polymer article after the abrasion test showed a water contact angle of 38° ($\theta_1/\theta_0=1.0$). This result shows that no decrease in the hydrophilic property (wettability) occurred after the abrasion test and that the hydrophylic polymer layer formed on the surface of the molded polymer article has very high adhesiveness to the main body of the molded polymer article and has very high durability.

Example 8

(1) The same procedures as in Example 7 (1) through (6) were followed, to obtain a molded polymer article.

(2) The molded polymer article obtained in (1) above was dyed by immersion in 0.5M aqueous $NiCl_2$ solution for 1 day. The dyed article was buried in an epoxy resin and frozen with liquid nitrogen. The frozen matter was sliced with a microtome into cut specimens. The specimen was observed in a transmission electron microscope at a magnification of 100,000, to show that a dyed layer having a thickness of 0.05 to 0.1 μm was present on the surface of the molded polymer article.

(3) The surface of the molded polymer article obtained in (1) above was subjected to elemental analysis by X-ray photoelectron spectroscopy, to show that a P2p peak was, although minute, present near 135 eV.

(4) Consequently, from the results of above (2) and (3), the presence of a hydrophilic polymer layer containing phosphorus atom, i.e. MPC, was verified.

Comparative Example 4

(1) In order to compare the present invention with the afore-described known process disclosed in Japanese Patent Application Laid-open No. 124523/1990, the procedure described in 11a of Example 11 of this Laid-open was followed, to obtain a methacrylate-functional hydroxyethylcellulose (a hydrophilic polymer having copolymerizable functional group).

(2) The same PVA concave and convex molds as used in Example 7, obtained by injection molding were immersed in a 0.5% solution of the methacrylate-functional hydroxyethylcellulose in methyl ethyl ketone, then gradually pulled up and dried by heating at 50° C. under a dry nitrogen atmosphere, to form a coating layer of the methacrylate-functional hydroxyethylcellulose on the surface of each of the convex and concave molds.

(3) The convex and concave molds having on the surface thereof a coating layer of the methacrylate-functional hydroxyethylcellulose were used and the procedures of Example 7 (3) through (6) were followed, to polymerize a photopolymerizable composition in the mold, dissolve the PVA mold in water, recover the molded polymer article and wash the surface of the molded polymer article.

(4) The molded polymer article obtained in (3) above was tested for the water contact angle, to show that the surface had a contact angle of 46°.

(5) The molded polymer article obtained in (3) above was subjected to the abrasion test according to the above method. The surface of the molded polymer article after the abrasion test showed a water contact angle of 62° ($\theta_1/\theta_0=1.35$).

(6) From the results of this Comparative Example 4, it is understood that, with the known process which comprises, not applying a monomer having a hydrophilic group and then polymerizing it, but simply coating the surface of a hydrophilc mold with a polymer having hydrophilic group, the hydrophilic polymer layer present on the surface of the resulting molded polymer article has poor adhesiveness to the main body of the molded polymer article and poor durability, so that the layer will, when exposed to external forces such as friction, be delaminated or drop off, thereby losing its hydrophilic property (wettability) in a short period of time and failing to maintain the hydrophilic property over a long period of time.

Comparative Example 5

In order to compare the present invention with the afore-described known process disclosed in Japanese Patent Application Laid-open No. 72430/1995, with reference to the procedure described in Example 1 of this Laid-open, a molded polymer article with its surface rendered hydrophilic by graft polymerization was obtained, as follows.

(1) That is, the same convex and concave molds for cast molding, comprising the water-soluble PVA, as used in Example 7 were used as it is without being coated on the surface thereof with a monomer having a hydrophilic group. The same photopolymerizable composition as used in Example 7 was poured into the concave mold, which was then closed, and polymerization was effected in the closed mold.

(2) The polymer obtained in (1) above was, as it was contained in the mold, immersed in water and, in the same manner as in Example 7, the mold was dissolved in water to recover a molded polymer article. The surface of the molded polymer article was washed thoroughly with water to remove the PVA having adhered to the surface.

(3) The molded polymer article obtained in (2) above was placed in a discharging apparatus (distance between the electrodes: 6 cm, voltage: 270 V; frequency: 60 Hz) and subjected to glow discharge treatment for 5 seconds under an argon atmosphere of 0.04 Torr.

(4) The molded polymer article glow discharged in (3) above was exposed to air and then placed in a pressure-proof glass tube having a diameter of 4 cm. A 10% aqueous MPC solution was added to complete immersion of the molded polymer article and, after the air inside the tube had been replaced with argon, the tube was sealed under reduced pressure.

(5) The pressure-proof glass tube sealed in (4) above was placed in a constant temperature bath at 80° C. for 1 hour, to carry out graft polymerization of MPC on the surface of the molded polymer article. Thereafter, the article was taken out from the aqueous MPC solution and the surface washed with water sufficiently.

(6) The molded polymer article obtained in (5) above was tested for the water contact angle, to show that the surface had a contact angle of 34°.

(7) The molded polymer article obtained in (5) above was subjected to the abrasion test according to the above method. The surface of the molded polymer article after the abrasion test showed a water contact angle of 77° ($\theta_1/\theta_0=2.26$).

(8) From the results of this Comparative Example 5, it is understood that, with the known process which comprises graft polymerizing a monomer having a hydrophilic group on the surface of a previously molded polymer article, the resulting hydrophilic polymer does not smoothly bond to the surface of the molded polymer article, so that the hydrophilic property will, when the surface of the molded polymer article is exposed to external forces such as friction, be lost in a short period of time and fail to be maintained over a long period of time.

(9) In order to check if a hydrophilic polymer is present on the surface of the molded polymer article obtained in (5) above, the article was, in the same manner as in Example 8, observed in a transmission electron microscope and tested for phosphorus by X-ray photoelectron spectroscopy. It was revealed that presence of a dyed layer was not verified and that no P2p peak was detected near 135 eV, that is, there was no evidence suggesting formation of an MPC polymer layer on the molded polymer article. From this result, it is estimated that a low contact angle of water of 34° of the molded polymer article before the abrasion test is, not because the formation of a hydrophilic polymer layer on the molded polymer article, but due to some chemical change having taken place on the surface.

Comparative Example 6

In order to compare the present invention with the afore-described known process disclosed in Japanese Patent Application Laid-open No. 7755/1973, with reference to the procedure described in Example 1 of this Laid-open, a molded polymer article comprising a crosslinked polysiloxane and, graft-polymerized on the surface thereof, a hydrophylic polymer was obtained, as follows.
(1) That is, 2 sheets of borosilicate glass plates whose surface had been washed with an alkali solution (saturated potassium hydroxide solution in isopropanol) (length×width×thickness=50 mm×50 mm×2 mm) (mold; contact angle of water: 0°) were immersed in a 50% solution of 2-hydroxyethyl methacrylate (HEMA) in isopropanol, then vertically pulled up at a rate of 5 mm/sec and then dried in air, to form a coating layer of HEMA on the surface of each of the glass plates.
(2) The HEMA coating surface of one of the glass plates coated with HEMA was held horizontally, on which a square quartz mold (inner size: length×width×depth=25 mm×25 mm×3 mm) was placed.
(3) Into the mold prepared in (2) above was poured polydimethylsiloxane (Stauffer-Wacker silicone No. 06093) was poured and, from above, another borosilicate glass plate coated with HEMA was placed under pressure.
(4) The mold with the contents was allowed to stand at room temperature for 30 minutes, to allow the monomer to reach equilibrium at the interface and then the mold was exposed to 5 Mrad from above and 5 Mrad from below, i.e. total 10 Mrad, of ionizing radiation.
(5) The polymer obtained in (4) above was, as it was contained in the mold, immersed in water for 1 day and taken out from the mold, to give a molded polymer article.
(6) The molded polymer article obtained in (5) above was tested for the water contact angle, to show that the surface having contacted the glass plate (mold) had a contact angle of 48°.
(7) The molded polymer article obtained in (5) above was subjected to the abrasion test according to the above method. The surface of the molded polymer article after the abrasion test showed a water contact angle of 79° ($\theta_1/\theta_0=1.65$).
(8) From the results of this Comparative Example 6, it is understood that, with the known process which comprises forming a coating layer of a monomer having a hydrophilic group on the surface of a hydrophilic mold, pouring polydimethylsiloxane into the mold and irradiating ionizing radiation to induce both polymerization of the coating layer monomer and cross-linking reaction of the polydimethylsiloxane and, simultaneously therewith, shaping them, the resulting hydrophilic polymer present on the molded polymer article has poor adhesiveness to the main body of the molded polymer article and poor durability, so that the layer will, when exposed to external forces such as friction, be delaminated or drop off, thereby losing its hydrophilic property (wettability) in a short period of time and failing to maintain the hydrophilic property over a long period of time.

Example 9

(1) A water-soluble PVA for melt molding (POVAL CP-1000; made by Kuraray Co., Ltd.) was injection molded into molds for cast polymerization. The molds consisted of a convex mold and concave mold, which had been designed such that engagement with each other would form a closed mold cavity corresponding to the outer size of a contact lens having a diameter of 14.0 mm, a BC of 8.6, a power of 0 and a central thickness of 0.2 mm.
(2) The convex and concave molds obtained in (1) above were each immersed in a 3% MPC solution in isopropanol, then pulled up gradually and dried under a dry nitrogen atmosphere, to be coated on the surface thereof with MPC.
(3) The convex and concave molds coated with MPC obtained in (2) above were used, and thereafter the procedures of Example 7 were followed, to inject a degassed photopolymerizable composition into the mold and effect polymerization by irradiating the UV Light for 1 hour with a high-pressure mercury lamp.
(4) The polymer obtained in (3) above was, as it was contained in the mold, immersed in water for one day. Then the PVA mold was dissolved off and a transparent contact lens having a diameter of 13.8 mm, a BC of 8.6 and a central thickness of 0.2 mm was recovered.
(5) The surface of the contact lens obtained in (4) above was washed thoroughly with water flow, to remove completely the PVA having adhered to the surface.
(6) The molded polymer article obtained in (5) above was tested for the water contact angle, to show that the surface had a contact angle of 38°, thus proving to have excellent hydrophilic property (wettability).

Obviously, numerous modifications and variations of the present invention are possible in light of the above teachings. It is therefore to be understood that within the limits of the appended clams, the invention may be practiced otherwise than as specifically described herein.

What is claimed is:
1. A molded polymer article, comprising a main molded body having a continuous coating covering an entire surface thereof of a hydrophilic polymer layer, the article being obtained by polymerizing both a monomer having a hydrophilic group and coated on an entire surface of a hydrophilic mold, and a polymerizable composition placed in the mold,
wherein a contact angle (θ) of water on said hydrophilic polymer layer present on the surface of the molded polymer article is not more than 40°;
wherein said polymerizable composition consists essentially of a monomer, an oligomer or a mixture thereof having a functional group copolymerizable with the monomer having the hydrophilic group; and further
wherein said hydrophilic polymer layer satisfies the following condition (I):

$$\theta_1/\theta_0 \leq 1.25 \tag{I}$$

wherein $\theta_1$ represents the contact angle of water on the hydrophilic polymer layer present on the surface of the molded polymer article, the surface layer having been subject to an abrasion test comprising contacting, under a pressure of 1.3 g/cm², the surface layer to a stationary cow leather having an average surface roughness with respect to central line of 0.5 μm, and rotating the molded polymer article at 500 rpm (at a linear velocity at contact point of 26 cm/sec) to a total of 5000 rotations; and $\theta_0$ represents the contact angle of water on the hydrophilic polymer layer present on the surface of the molded polymer article before the abrasion test.

2. The molded polymer article of claim 1, wherein the hydrophilic polymer layer has a thickness of 0.005 to 10 μm.
3. The molded polymer article of claim 2, wherein the hydrophilic polymer layer has a thickness of 0.01 to 1 μm.
4. The molded polymer article of claim 1, wherein said hydrophilic mold is made of polyvinyl alcohol.
5. The molded polymer article of claim 4, wherein the polyvinyl alcohol is water-soluble.
6. The molded polymer article of claim 4, wherein the polyvinyl alcohol has a degree of polymerization of 200 to 1,000, and a degree of saponification of 50 to 90%.

7. The molded polymer article of claim 1, wherein said monomer having a hydrophilic group comprises a monomer having a phosphoryl group.

8. The molded polymer article of claim 1, wherein said total amount of said monomer or oligomer or mixture thereof having a functional group copolymerizable with the monomer having the hydrophilic group is not more than 90 mole % of the polymerizable composition.

9. The molded polymer article of claim 8, wherein said total amount is not more than 80 mole % of the polymerizable composition.

10. The molded polymer article of claim 9, wherein said total amount is not more than 60 mole % of the polymerizable composition.

11. The molded polymer article of claim 1, which is a medical product.

12. The molded polymer article of claim 1, which is a contact lens.

13. The molded polymer article of claim 12, which is an artificial organ.

14. The molded polymer article of claim 12, which is an intraocular lens.

15. The molded polymer article of claim 7, wherein the monomer having a hydrophilic group is 2-methacryloyloxyethylphosphoryl choline.

16. The molded polymer article of claim 1, wherein $\theta_1/\theta_0$ is 1.0.

17. The molded polymer article of claim 1, wherein $\theta_1/\theta_0$ is 0.98.

18. The molded polymer article of claim 1, wherein $\theta_1/\theta_0$ is 0.90.

* * * * *

UNITED STATES PATENT AND TRADEMARK OFFICE
CERTIFICATE OF CORRECTION

PATENT NO. : 6,310,116 B1
DATED : October 30, 2001
INVENTOR(S) : Yasuda et al.

It is certified that error appears in the above-identified patent and that said Letters Patent is hereby corrected as shown below:

<u>Title page,</u>
Item [75], the Inventors' information should read:
-- [75] Inventors: **Tokugen Yasuda; Hitoshi Inoue;
Satsuki Kitajima; Masahiro Satoh;
Wu Yang, all of Kyoto; Ikuo Omura,**
Kurashiki, all of (JP).

Signed and Sealed this

Twenty-eighth Day of May, 2002

Attest:

Attesting Officer

JAMES E. ROGAN
*Director of the United States Patent and Trademark Office*